Feb. 7, 1956    T. H. SHERMAN    2,733,692
OIL HEATER
Original Filed Dec. 1, 1945    2 Sheets-Sheet 1
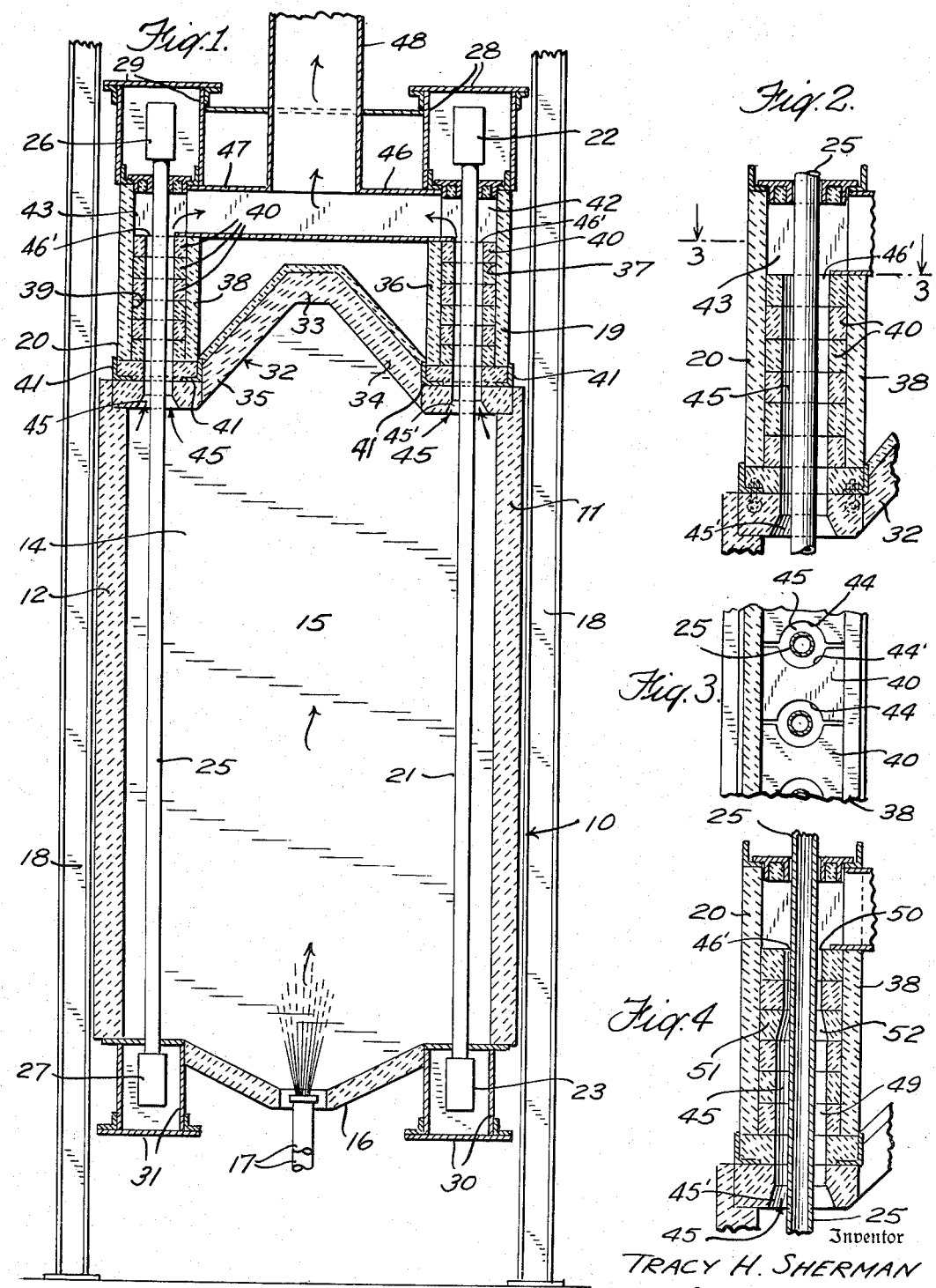
Inventor
TRACY H. SHERMAN
By E. Francis Wentworth Jr.
Attorney

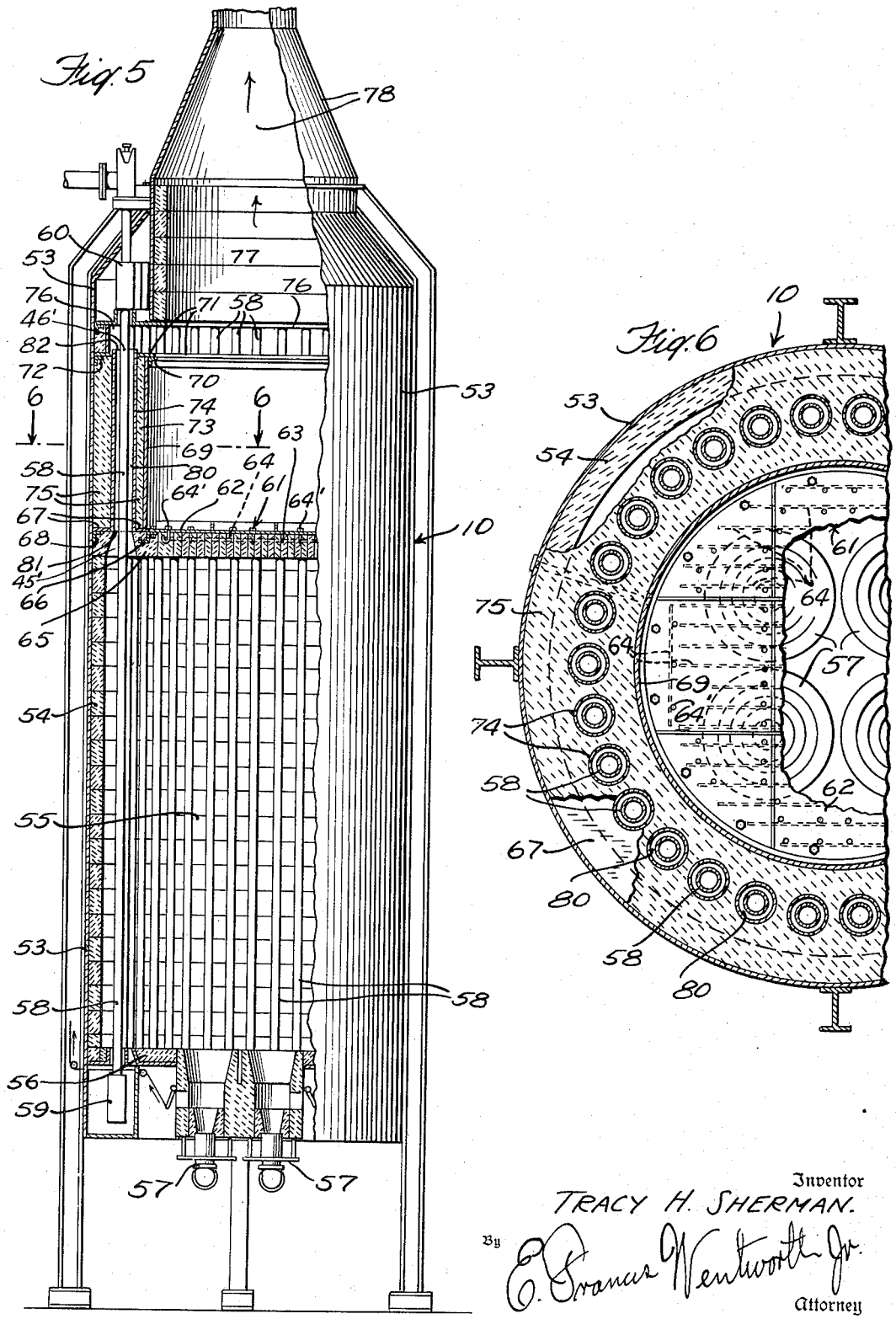

United States Patent Office 2,733,692
Patented Feb. 7, 1956

2,733,692

OIL HEATER

Tracy H. Sherman, South Nyack, N. Y., assignor to Foster Wheeler Corporation, New York, N. Y., a corporation of New York Original application December 1, 1945, Serial No. 632,159, now Patent No. 2,592,608, dated April 15, 1952. Divided and this application October 12, 1951, Serial No. 251,046

12 Claims. (Cl. 122—356)

This invention relates to heaters and more particularly pertains to fluid heating apparatus of the type in which the fluid to be heated is passed through tubular members in heat exchange relationship with a stream of products of combustion.

This application is a division of application Serial Number 632,159 filed December 1, 1945, now Patent 2,592,608.

The present invention provides a heater used in the conversion of fluids, particularly in the conversion of hydrocarbon oil. Uniform heating of the tubular members both circumferentially and longitudinally thereof is provided in the heater of the present invention, which heater is efficient and of relatively simple construction.

The invention will be understood from the following description, when considered in connection with the accompanying drawings forming a part thereof and in which:

Fig. 1 is a vertical sectional view of a heater embodying the invention;

Fig. 2 is an enlarged view of a portion of the upper part of the heater of Fig. 1;

Fig. 3 is a sectional view taken on line 3—3 of Fig. 2;

Fig. 4 is a view similar to Fig. 2 but of another embodiment of the invention;

Fig. 5 is a view somewhat similar to Fig. 1 but only partly in section showing the invention as applied to a cylindrical heater; and Fig. 6 is a fragmentary plan view on an enlarged scale taken on line 6—6 of Fig. 5.

Like characters of reference refer to the same or to similar parts throughout the several views.

Referring to the drawings, reference character 10 designates the setting of a heater suitable for the heating of liquids such as hydrocarbon oils and the like, although it is not limited to the heating of such oils but is useful in the heating of a wide variety of liquids, vapors and gases. The setting 10, as shown in Fig. 1, is of a generally rectangular shape in transverse cross-section and comprises oppositely disposed refractory side walls 11 and 12 and opposite end walls of which one wall 14 is shown, said side and end walls forming a combustion chamber 15. A depressed floor 16 is at the bottom of the chamber and has a plurality of horizontally spaced burners 17 disposed therein intermediate the side walls 11 and 12, said burners being so positioned as to direct a stream of products of combustion generally vertically upwardly in the chamber. The heater is supported by a plurality of girders 18. The upper portion 19 of the wall 11 and the upper portion 20 of the wall 12 are both offset inwardly toward the chamber 15 from the lower portion of said walls below said upper portions.

In the embodiment of the invention disclosed in Figs. 1 to 3, a row of spaced generally vertically extending tubular members 21 is disposed along the side wall 11 in spaced relationship to the inner surface of the upper portion 19 of the wall 11 and the inner surface of the remainder of said wall. The tubular members 21 are connected to an upper header 22 at one end thereof and to a lower header 23 at the opposite end. A similar row of tubular members 25 is disposed along the side wall 12 in spaced relationship to the inner surface of both the upper and lower portions of said side wall. The tubular members 25 are connected at the upper end to a header 26 and at the lower end to a header 27. Upper headers 22 and 26 are enclosed in header boxes 28 and 29, respectively, while lower headers 23 and 27 are enclosed, respectively, in similar header boxes 30 and 31. Tubular members 21 and 25 are substantially equidistant from the burners 17.

A combustion gas-directing baffle 32 is disposed in the upper part of the chamber 15 in the path of flow of the gases of combustion from the burners 17. The baffle comprises a substantially horizontally extending central portion 33 and side sections 34 and 35 which extend obliquely downwardly from the central portion. A substantially vertically extending wall 36 adjoins the section 34 and extends upwardly in laterally spaced relationship with the tubular members 21 and the upper portion of the wall 19 so as to form a chamber 37. A wall 38 similar to wall 36 adjoins section 35 and extends upwardly thereof in laterally spaced relationship with the upper portion 20 of wall 12 and tubular members 25 to form a chamber 39. Baffle 32 and walls 36 and 38 extend lengthwise of chamber 15 its entire length and abut opposite end walls of which one wall 14 is shown. Baffle 32 and walls 36 and 38 may be formed of a single piece of refractory or be formed of separate pieces, as illustrated, which are secured together in any desired manner. As shown in Figs. 1 to 4, a plurality of rows of refractory tiles 40 are positioned in chambers 37 and 39 in superposed relationship to one another adjacent the upper part of tubular members 21 and 25, said tiles being supported at the bottom by angles 41 and extending upwardly in the chambers to a point short of the top to form a horizontally extending passage 42 adjacent the top of chamber 37 and a horizontally extending passage 43 adjacent the top of chamber 39. Chambers 42 and 43 extend horizontally between the opposite end walls of the heater setting of which one wall 14 is shown. Tiles 40 are positioned in the spaces between tubes 21 and in the spaces between tubes 25 and have semicircular cutout portions 44 and 44' (Fig. 3) adjacent the tubes, said cutout portions being concentric to the tubes and having a larger radius than the radius of the tubes so that a vertically extending circular passage 45 having a gas inlet 45' and a gas outlet 46' is formed around each tube, the inner surface of said passage being concentric to the tube and extending around the entire periphery of a tube closely adjacent thereto.

Horizontally extending passages 42 and 43 are in communication intermediate the opposite ends thereof with gas outlet conduits 46 and 47, respectively, which conduits are connected to a flue 48.

In operation, the gases of combustion flowing generally vertically upwardly in the chamber 15, in heat exchange relationship with tubular members 21 and 25 in said chamber, impinge upon baffle 32, the oblique side sections 34 and 35 directing the gases toward tubes 21 and 25, respectively, and toward the inlet end 45' of vertical passages 45 around tubes 21 and 25. Gases from chamber 15 enter passages 45 and flow vertically upwardly therein axially of and in heat exchange relationship with the upper portion of tubular members. Since passages 45 are circular and concentric to the tubes which they surround, heat flows evenly around the entire circumference of the portion of each tube within the passages. Heat is radiated evenly from the wall of each passage to the entire circumference of the tube which it surrounds. Gases from passages 45 flow into the horizontally extending passages 42 and 43, thereafter to pass in a general horizontal direction in heat exchange relationship with the portion of the tubular members 21 and 25 in passages 42 and 43 toward gas outlet conduits 46 and 47, respectively. From conduits 46 and 47 the gases flow outwardly of the setting through flue 48.

In the embodiment of the invention shown in Fig. 4, which is somewhat similar to the embodiment shown in Figs. 1 to 3, the semicircular cutout portions 44 and 44' of the tiles 40 are of larger radius in the lowermost tiles of each row than the radius of the cutout portions 44 and 44' of the uppermost tiles of each row. The passage 45 will, therefore, have a lower portion 49 of greater diameter than the upper portion 50 thereof. The cutout portions 44 and 44' of an intermediate tile 51 have a tapered surface forming a frusto-conical shaped passage 52 between the lower portion 49 and the upper portion 50 of passage 45. In this form of the invention, as the gases lose heat in flowing through passage 45, the area of said passages decreases, thereby increasing the mass velocity of the gases and heat transfer to the portion of the tubular members in the upper portion 50 of the passage. As in the form of the invention shown in Figs. 1 to 3, passage 45 is concentric to the portion of the tube which passes through it, the inner surface of said vertical passage extending around the entire periphery of the tubular member closely adjacent thereto.

The embodiment of the invention shown in Figs. 5 and 6 is somewhat similar to the embodiment shown in Figs. 1 to 3, but the setting 10 is of a cylindrical shape and comprises a continuously circular metallic outer side wall 53 lined along its inner peripheral surface with a refractory brick lining 54, thereby forming a cylindrical combustion chamber 55. A substantially horizontal floor 56 is at the bottom of the chamber and has a plurality of burners 57 disposed in it, spaced concentrically about the center point of chamber 55 (Fig. 6). A circular row of spaced, generally vertically extending tubular members 58 is disposed along the refractory lining of the circular side wall 53 in laterally spaced relationship therewith and spaced concentrically about the center point of the combustion chamber 55. To these tubular members 58 is connected a lower header 59 at one end thereof and an upper header 60 at the opposite end.

A combustion gas-directing baffle 61 is disposed in the upper part of chamber 55 in the path of flow of gases passing upwardly in the chamber from burners 57. Baffle 61, as shown, comprises a circular metallic plate 62 of such diameter that the periphery thereof is in spaced relationship with the row of tubular members 58. Plate 62 is lined on the under side with a plurality of downwardly projecting refractory bricks 63 supported on the plate by a plurality of rods 64 which extend transversely of the bricks through apertures therein. Rods 64 are supported by J-bolts 64' which are secured to plate 62. A peripheral row of bricks 65 is supported by a downwardly projecting L-member 66 secured to plate 62. Plate 62 is fastened on its underside to a ring 67, the outside diameter of which is substantially equal the outside diameter of setting 10. The ring is supported on angle 68 adjacent its outer periphery. Ring 67 is supported adjacent its inner periphery by a cylindrically shaped metallic member 69 which at its upper end is secured at 70 to an upper ring 71 adjacent the inner periphery of said ring. Ring 71 is supported at its outer periphery of a bracket 72 on side wall 53. The diameter of member 69 is less than the inner diameter of chamber 55, so that a circular chamber 73 is formed above ring 67.

Metallic sleeves 74, which have an inside diameter slightly larger than the outside diameter of tubular members 58, are positioned about said members in chamber 73 so as to provide a narrow axial passage 80 around and concentric to that portion of the tubular members extending through chamber 73. Passage 80 has a gas inlet 81 and a gas outlet 82. Rings 67 and 71 have apertures therein through which tubular members 58 pass, the apertures being of such size that sleeves 74 will be retained therein. The space in chamber 73 around the various sleeves is filled with refractory 75. Circular member 69, sleeves 74 and refractory 75 in chamber 73 extend upwardly to a point short of the top of chamber 55 to form a circular passage 76 adjacent the top of chamber 73. Pasage 76 is in communication with a gas outlet opening 77, which in turn communicates with flue 78.

In operation, gases of combustion are directed upwardly in chamber 55 by burners 57 and pass in radiant heat exchange relationship with the portion of the tubular members 58 within the chamber. The upwardly directed gases impinge on baffle 61 and are directed horizontally to the inlets 81 of gas passages 80 around the upper portion of the tubular members. Gases entering through inlets 81 flow through passages 80 in a vertical direction, thereafter passing outwardly through outlets 82 into circular passage 76. In passage 76 the gases flow transversely of the upper portion of tubular members 58 in a horizontal direction and thereafter flow outwardly of the setting through gas outlet opening 77 and flue 78.

It will be noted that in the embodiment of the invention illustrated in Figs. 5 and 6, the gases of combustion which are cooled by flowing in radiant heat exchange relationship with that portion of the tubular members in chamber 55 are caused to pass into the confined space around the upper portion of the members provided by sleeves 74, so that heat will flow evenly around the entire circumference of that portion of the tubes in the passage, a great proportion of the heat thereby being extracted.

Changes may be made in the form, location and relative arrangement of the several parts of the heater disclosed without departing from the principles of the present invention. It will be understood that the invention is not to be limited excepting by the scope of the appended claims.

What is claimed is:

1. In a furnace for heating fluids, a furnace chamber having a gas outlet opening, a plurality of generally vertically extending tubular members disposed in said chamber, means forming around the members of said plurality of tubular members, gas passages equal in number to said members, one passage for each member and each passage extending axially around a portion of said member, each said gas passage being in communication with the furnace chamber through a gas inlet and with the chamber gas outlet opening, through a gas outlet, said passage gas inlet and outlet being at opposite ends of the passage, the passage being contiguous to said tubular member and providing a confined flow path through which gases pass from the furnace chamber to the chamber gas outlet, and means for producing a stream of products of combustion which flows mainly in radiant heat exchange relationship with the portion of a tubular member outside said gas passage prior to entering said passage.

2. In a furnace for heating fluids, a substantially vertically extending furnace chamber having a gas outlet opening adjacent one end of the furnace, a plurality of generally vertically extending tubular members disposed in said chamber, means forming around the members of said plurality of tubular members, gas passages equal in number to said members, one passage for each member and each passage extending axially around a portion of said member adjacent said one end thereof, each said gas passage being in communication with the furnace chamber through a gas inlet and with the chamber gas outlet opening through a gas outlet, said passage gas inlet and outlet being at opposite ends of the passage, the passage being contiguous to said tubular member and providing a confined flow path through which gases pass from the furnace chamber to the chamber gas outlet, and means for producing a stream of products of combustion which flows generally vertically and mainly in radiant heat exchange relationship with the portion of a tubular member in said furnace chamber prior to entering said gas passage.

3. In a furnace for heating fluids, a substantially vertically extending furnace chamber having a gas outlet opening adjacent the upper end of the furnace, a plurality of generally vertically extending tubular members adjacent the inner periphery of said chamber, means forming around the members of said plurality of tubular members, gas passages equal in number to said members, one passage for each member and each passage extending axially around a portion of said member adjacent said upper end thereof, each said gas passage being in communication with the furnace chamber through a gas inlet and with the chamber gas outlet opening through a gas outlet, said passage gas inlet being at the lower end of the passage and outlet being at the upper end thereof, the passage being contiguous to said tubular members and providing a confined flow path through which gases pass from the furnace chamber to the chamber gas outlet, and means for producing a stream of products of combustion which flows generally vertically and mainly in radiant heat exchange relationship with the portion of a tubular member in said furnace chamber prior to entering said gas passage.

4. In a furnace for heating fluids, a furnace chamber having a gas outlet opening adjacent one end of the furnace, a plurality of generally vertically extending tubular members adjacent the inner periphery of said chamber, means forming around the members of said plurality of tubular members, circular gas passages equal in number to said members, one passage for each member and each passage extending axially around a portion of said member adjacent said one end thereof, each said circular gas passage being concentric to said tubular member, each said gas passage being in communication with the furnace chamber through a gas inlet and with the chamber gas outlet opening through a gas outlet, said passage gas inlet and outlet being at opposite ends thereof, the passage being contiguous to said tubular member and providing a confined flow path through which gases pass from the furnace chamber to the chamber gas outlet, and means for producing a stream of products of combustion which flows generally vertically and mainly in radiant heat exchange relationship with the portion of a tubular member in said furnace chamber prior to entering said gas passage.

5. In a furnace for heating fluids, a furnace chamber having a gas outlet opening adjacent one end of the furnace, a plurality of generally vertically extending tubular members adjacent the inner periphery of said chamber, cylindrically shaped metallic sleeves forming around the members of said plurality of tubular members, circular gas passages equal in number of said members, one passage for each member and each passage extending axially around a portion of said member, each said sleeve having an inside diameter greater than the outside diameter of said tubular member and extending axially of a portion of the tubular member adjacent said one end thereof, each said sleeve being positioned in concentric relationship to said tubular member, each said gas passage formed around said tubular member by the sleeve being in communication with the furnace chamber through a gas inlet and with the chamber gas outlet opening through a gas outlet, said passage gas inlet and outlet being at opposite ends thereof, the passage being contiguous to said tubular member and providing a confined flow path through which gases pass from the furnace chamber to the chamber gas outlet, and means for producing a stream of products of combustion which flows generally vertically and mainly in radiant heat exchange relationship with the portion of a tubular member in said furnace chamber prior to entering said gas passage.

6. In a furnace for heating fluids, a furnace chamber having a gas outlet opening adjacent one end of the furnace, a plurality of generally vertically extending tubular members adjacent the inner periphery of said chamber and in spaced relationship thereto, refractory means forming around the members of said plurality of tubular members, circular gas passages equal in number to said members, one passage for each member and each passage extending axially around a portion of said member adjacent said one end thereof, each said circular gas passage being concentric to said tubular member, each said gas passage being in communication with the furnace chamber through a gas inlet and with the chamber gas outlet opening through a gas outlet, said passage gas inlet and outlet being at opposite ends thereof, the passage being contiguous to said tubular members and providing a confined flow path through which gases pass from the furnace chamber to the chamber gas outlet, and means for producing a stream of products of combustion which flows generally vertically and mainly in radiant heat exchange relationship with the portion of a tubular member in said furnace chamber prior to entering said gas passage.

7. In a furnace for heating fluids, a cylindrical furnace chamber having a gas outlet opening adjacent one end of the furnace, a plurality of generally vertically extending tubular members adjacent the inner periphery of said chamber, means forming around the members of said plurality of tubular members, gas passages equal in number to said members, one passage for each member and each passage extending axially around a portion of said member adjacent said one end thereof, each said gas passage being in communication with the furnace chamber through a gas inlet and with the chamber gas outlet opening through a gas outlet, said passage gas inlet and outlet being at opposite ends thereof, the passage being contiguous to said tubular member and providing a confined flow path through which gases pass from the furnace chamber to the chamber gas outlet, and means for producing a stream of products of combustion which flows generally vertically and mainly in radiant heat exchange relationship with the portion of a tubular member outside said gas passage prior to entering said gas passage.

8. In a furnace for heating fluids, a substantially vertically extending cylindrically shaped furnace chamber having a gas outlet opening adjacent the upper end of the furnace, a plurality of generally vertically extending tubular members adjacent the inner periphery of said chamber and in spaced relationship thereto, means forming around the members of said plurality of tubular members, circular gas passages equal in number to said members, one passage for each member and each passage extending axially around a portion of said member adjacent said upper end thereof, each said circular gas passage being concentric to said tubular member, each said gas passage being in communication with the furnace chamber through a gas inlet and with the chamber gas outlet opening through a gas outlet, said passage gas inlet being at the lower end of the passage and the outlet being at the upper end thereof, the passage being contiguous to said tubular member and providing a confined flow path through which gases pass from the furnace chamber to the chamber gas outlet, and burner means adjacent the lower end of the furnace chamber for producing a stream of products of combustion, said burner means being disposed to direct a stream of gases of combustion generally vertically upwardly in the chamber and mainly in radiant heat exchange relationship with the portion of a tubular member in said furnace chamber prior to entering said gas passage.

9. In a furnace for heating fluids, a substantially vertically extending cylindrically shaped furnace chamber having a gas outlet opening adjacent the upper end of the furnace, a plurality of generally vertically extending tubular members adjacent the inner periphery of said chamber and in spaced relationship thereto, means forming around the members of said plurality of tubular members, gas passages equal in number to said members, one passage for each member and each passage extending axially around a portion of said member adjacent said upper end thereof, each said gas passage being in communication with the furnace chamber through a gas inlet and with the chamber gas outlet opening through a gas outlet, said passage gas inlet being at the lower end of the passage and the outlet being at the upper end thereof, the passage being contiguous to said tubular member and providing a confined flow path through which gases pass from the furnace chamber to the chamber gas outlet, burner means adjacent the lower end of the furnace chamber for producing a stream of products of combustion, said burner means being disposed to direct a stream of gases of combustion generally vertically upwardly in the chamber and mainly in radiant heat exchange relationship with the portion of a tubular member in said furnace chamber, a baffle positioned in the furnace chamber in the path of flow of said upwardly passing gases, said baffle being so constructed and arranged as to cause the gases to flow into the gas inlet of said passage after passing in heat exchange relationship with said portion of a member in said furnace chamber.

10. In a furnace for heating fluids, a substantially rectangular-shaped, vertically extending furnace chamber having a gas outlet opening adjacent the upper end of the furnace, a plurality of generally vertically extending tubular members adjacent opposite side walls of said chamber, means forming around the members of said plurality of tubular members, gas passages equal in number to said members, one passage for each member and each passage extending axially around a portion of said member adjacent said upper end thereof, each said gas passage being in communication with the furnace chamber through a gas inlet and with the chamber gas outlet opening through a gas outlet, said passage gas inlet being at the lower end of the passage and the outlet being at the upper end thereof, the passage being contiguous to said tubular member and providing a confined flow path through which gases pass from the furnace chamber to the chamber gas outlet, and burner means adjacent the lower end of the furnace chamber for producing a stream of products of combustion, said burner means being disposed to direct a stream of gases of combustion generally vertically upwardly in the chamber and mainly in radiant heat exchange relationship with the portion of a tubular member in said furnace chamber prior to entering said gas passage.

11. In a furnace for heating fluids, a furnace chamber having a gas outlet opening adjacent one end of the furnace, a plurality of generally vertically extending tubular members adjacent the inner periphery of said chamber and in spaced relationship thereto, means forming around the members of said plurality of tubular members, gas passages equal in number to said members, one passage for each member and each passage extending axially around a portion of said member adjacent said one end thereof, each said gas passage being in communication with the furnace chamber through a gas inlet and with the chamber gas outlet opening through a gas outlet, said passage gas inlet and outlet being at opposite ends thereof, the passage being contiguous to said tubular member and so formed as to provide a confined flow path through which gases pass from the furnace chamber to the chamber gas outlet, which flow path decreases in transverse section in the direction of flow of said gases, and means for producing a stream of products of combustion which flows generally vertically and mainly in radiant heat exchange relationship with the portion of a tubular member in said furnace chamber prior to entering said gas passage.

12. In a furnace for heating fluids, a substantially vertically extending furnace chamber having a gas outlet opening adjacent the upper end of the furnace, a plurality of generally vertically extending tubular members adjacent the inner periphery of said chamber, means forming around the members of said plurality of tubular members, gas passages equal in number to said members, one passage for each member and each passage extending axially around a portion of said member adjacent said upper end thereof, each said gas passage being in communication with the furnace chamber through a gas inlet and with the chamber gas outlet opening through a gas outlet, said passage gas inlet being at the lower end of the passage and the outlet being at the upper end thereof, the passage being contiguous to said tubular member and so formed as to provide a confined flow path through which gases pass from the furnace chamber to the chamber gas outlet, which flow path is of a lesser transverse section at the upper part thereof than at the lower part, and burner means adjacent the lower end of the furnace chamber for producing a stream of products of combustion, said burner means being disposed to direct a stream of gases of combustion generally vertically upwardly in the chamber and mainly in radiant heat exchange relationship with the portion of a tubular member in said furnace chamber prior to entering said passage.

References Cited in the file of this patent

UNITED STATES PATENTS

| | | |
|---|---|---|
| 1,737,173 | Pratt | Nov. 26, 1929 |
| 1,846,955 | Dow | Feb. 23, 1932 |
| 1,881,275 | Huff | Oct. 4, 1932 |
| 2,228,938 | Wood | Jan. 14, 1941 |
| 2,323,498 | Thompson | July 6, 1943 |
| 2,340,287 | Throckmorton et al. | Feb. 1, 1944 |
| 2,385,749 | Wallis et al. | Sept. 25, 1945 |
| 2,454,943 | Reed | Nov. 30, 1948 |
| 2,514,279 | Gleber | July 4, 1950 |
| 2,592,608 | Sherman | Apr. 15, 1952 |